(12) United States Patent
Burki

(10) Patent No.: US 11,359,150 B2
(45) Date of Patent: Jun. 14, 2022

(54) MODULAR SYNGAS SYSTEM, MARINE VESSEL POWERED THEREBY, AND METHOD OF OPERATION

(71) Applicant: Subgeni LLC, Tempe, AZ (US)

(72) Inventor: Taimur K. Burki, Tempe, AZ (US)

(73) Assignee: SUBGENI LLC, Tempe, AZ (US)

( * ) Notice: Subject to any disclaimer, the term of this patent is extended or adjusted under 35 U.S.C. 154(b) by 0 days.

(21) Appl. No.: 17/081,643

(22) Filed: Oct. 27, 2020

(65) Prior Publication Data

US 2021/0122988 A1 Apr. 29, 2021

Related U.S. Application Data

(60) Provisional application No. 63/038,951, filed on Jun. 15, 2020, provisional application No. 62/927,071, filed on Oct. 28, 2019.

(51) Int. Cl.
| | |
|---|---|
| *C10J 3/72* | (2006.01) |
| *C01B 3/02* | (2006.01) |
| *F02C 3/22* | (2006.01) |

(52) U.S. Cl.
CPC .............. *C10J 3/72* (2013.01); *C01B 3/02* (2013.01); *F02C 3/22* (2013.01); *C10J 2200/31* (2013.01); *C10J 2300/0946* (2013.01); *C10J 2300/1671* (2013.01); *F05D 2220/32* (2013.01); *F05D 2220/722* (2013.01)

(58) Field of Classification Search
CPC ........ C10J 2300/1646; C10J 2300/1671; C10J 2300/1884; C10J 2300/0946; C01B 2203/066; C01B 2203/0838; C01B 2203/84; C01B 3/36
See application file for complete search history.

(56) References Cited

U.S. PATENT DOCUMENTS

| | | | | |
|---|---|---|---|---|
| 8,513,316 | B2 | 8/2013 | Gueh | |
| 2004/0251241 | A1* | 12/2004 | Blutke | C10J 3/78 |
| | | | | 219/121.59 |
| 2005/0132883 | A1* | 6/2005 | Su | B01D 53/1425 |
| | | | | 423/220 |

(Continued)

FOREIGN PATENT DOCUMENTS

CN 207683728 U 8/2018

*Primary Examiner* — Imran Akram
(74) *Attorney, Agent, or Firm* — Flener IP & Business Law; Zareefa B. Flener; Ayhan E. Mertogul

(57) ABSTRACT

A land based or marine vessel based system for generating power from syngas utilizes a feedstock of waste material acquired from waste dumps, municipalities, and/or ports of call of the marine vessel. The marine vessel or land based system can be retrofitted to be fueled by the waste material. The syngas is used to provide propulsive and/or electrical power for the marine vessel or the land based system. The waste material is not just a feedstock for the syngas but is provided with payment from the ports of call to take the waste material away. The marine vessel also collects garbage floating on the waterway along the voyage between the various ports of call for use as feedstock in the production of syngas. The modular syngas generation system further generates $H_2$ from the syngas. The $H_2$ generated thereby is used to fuel an $H_2$ fuel cell for the generation of electrical power.

7 Claims, 9 Drawing Sheets

(56) References Cited

U.S. PATENT DOCUMENTS

| | | | |
|---|---|---|---|
| 2007/0017864 A1* | 1/2007 | Price | C10J 3/20 |
| | | | 210/603 |
| 2007/0056247 A1* | 3/2007 | Bowe | C10K 3/023 |
| | | | 52/749.1 |
| 2009/0169452 A1* | 7/2009 | Constantz | C01F 11/18 |
| | | | 423/230 |
| 2010/0156104 A1* | 6/2010 | Bottinelli | C10J 3/20 |
| | | | 290/52 |
| 2011/0009500 A1* | 1/2011 | Gueh | C10G 2/32 |
| | | | 518/704 |

* cited by examiner

MODULAR SYNGAS SYSTEM, MARINE VESSEL POWERED THEREBY, AND METHOD OF OPERATION

CROSS-REFERENCE TO RELATED APPLICATIONS

This application claims priority to U.S. Provisional Patent Application No. 62/927,071 filed on Oct. 28, 2019 and U.S. Provisional Patent Application No. 63/038,951 filed on Jun. 15, 2020.

FIELD OF THE INVENTION

The present invention relates to a modular syngas system having an $H_2$ generator, and to a vessel powered thereby. More specifically, the present invention relates to a syngas power generation system that utilizes feedstock comprising waste where the syngas power generation system can be used as a land-based or marine vessel based system, and wherein one embodiment of the syngas power generation system includes an $H_2$ generator that provides $H_2$ to an $H_2$ fuel cell, and can further optionally include a closed-cycle regenerative heat engine and/or a heat recovery chiller.

BACKGROUND

Syngas as known in the art is a mixture of gases typically comprising hydrogen ($H_2$), carbon monoxide (CO), and carbon dioxide ($CO_2$). Syngas producing systems as are known in the art produce syngas from a waste material feedstock, which may comprise, for example without limitation, naturally occurring feedstocks such as coal, natural gas, and wood, as well as garbage feedstocks such as household or industrial waste, sludge, electronics, organic waste, agricultural waste, chemical waste, plastics, and even old vehicle tires, among other known types of garbage. Syngas producing systems therefore provide a beneficial and profitable solution to the disposal of garbage feedstocks. The process for producing syngas, known as gasification, is also well known in the art. Gasification converts carbonaceous materials into syngas, for example, by reacting the carbonaceous materials at a high temperature (typically 650° C. or hotter) with a controlled amount of oxygen, air, and/or steam without combustion.

Syngas has multiple uses in an industrial and energy producing context. One exemplary use of syngas is as a fuel that is burned in a combustor to produce hot exhaust gases. The hot exhaust gases could be expanded through a turbine to generate electricity. Alternatively, the hot exhaust gases could be used to produce steam that is allowed to expand through a turbine to generate electricity. Combustors and turbines specifically designed for use with Syngas are known in the art and have been in use for years. One example is the model 7F syngas turbine made by General Electric (GE). The GE model 7F turbine is often used with GE's "multi-nozzle quiet combustor" (MNQC), which has been known in the art for decades. Another alternative use for syngas is as a feedstock itself for other processes as are known in the art for producing hydrocarbons, for example, the Fischer-Tropsch process.

Vessels having an onboard system for the production of syngas from a carbonaceous feedstock are known in the art. For example, Gueh U.S. Pat. No. 8,513,316 discloses a marine vessel (4) that converts a carbonaceous feedstock (A) into syngas (7) and subsequently converts the syngas (7) into a hydrocarbon product (B). Although the source of heat for the gasification process can be any of a number of sources, Gueh discloses that the source of heat is molten metal that is melted by any number of mechanisms including an electric arc, induction heating, a plasma arc torch, a gas torch, and other mechanisms. The collection of waste by a vessel traveling across the surface of waterways is also known in the art. For example, CN207683728U discloses a garbage collection vessel comprising a two-level garbage collection mechanism for the collection of plastic bottles and other plastic garbage from the water's surface.

It is known in the art that the cost for fueling a marine vessel carrying cargo across an ocean is tremendously expensive. For example, fuel cost for an exemplary marine vessel traveling from Los Angeles in the United States to Tokyo, Japan is about $700000 using conventional fuels. What is needed is a more cost-effective fuel that can be used to power marine vessels, especially to power the propulsive requirements of such marine vessels.

Municipalities around the world generate a tremendous amount of waste material that ends up being transported at high cost to the municipality, sometimes through ports, to a burial site and/or for incineration. It would also be beneficial if there were another use for the municipal waste material that didn't involve incineration and/or burial, both of which cause pollution of the environment. It would be further beneficial if the municipality could save some of the cost of disposing of the waste material by providing it to a third party at a cost lower than that associated with the cost of disposal. It would be additionally beneficial if the municipality could utilize syngas produced by marine vessels docking at their ports or produced by fixed or mobile land-based syngas producing systems for use in local power plants. It would be still further beneficial if the syngas producing system, whether marine vessel based, or fixed or mobile land based could generate electricity from the syngas for supply to a local municipality or electric grid in general.

Therefore, a need exists for a marine vessel or a fixed or mobile land based system that is built or retrofitted to be fueled by a cost-effective fuel produced from waste material that is readily available at the ports served by marine vessels or otherwise available to the land based system. The cost-effective fuel, syngas, could be created on board the marine vessel or within the fixed or mobile land based system from the waste material received from a port of call or a municipal waste site. The waste material is not just a feedstock for the syngas but is provided with payment from the port of call or the municipality to take the waste material away. It would be further beneficial if a marine vessel having such a syngas system could also collect garbage floating on the waterway along the voyage between various ports of call for use as feedstock in the production of the syngas.

A further need exists for a ship-based or fixed or mobile land based syngas system that could be modified or improved to generate $H_2$ from the syngas. It would be further beneficial if the $H_2$ generated thereby could be used to power an $H_2$ fuel cell for the generation of electrical power. Such a system could be further improved if it were made modular including optional modules, for example without limitation, utilizing a closed-cycle regenerative heat engine or a heat recovery chiller designed to further increase the efficiency of the system.

SUMMARY OF THE INVENTION

According to one aspect of the invention, a modular system for generating power from syngas comprises a modular system for producing syngas from a feedstock, a modular combustor or a combined modular combustor and modular boiler assembly, and one or more modular turbines. At least a portion of the syngas produced by the modular system for producing syngas is burned in the modular combustor to produce hot exhaust gases. The hot exhaust gases are passed through the one or more modular turbines, or are directed to the modular boiler to produce steam that is passed through the one or more modular turbines.

According to another aspect of the invention, a system for producing syngas comprises one or more heating units, and a gasification unit supplied with waste material and heated by the one or more heating units, wherein the gasification unit produces syngas from the waste material. The system further comprises a scrubber into which the syngas is passed, and one or more hydrogen fuel cells. Hydrogen gas is separated out from the syngas by the scrubber, wherein the hydrogen gas is either supplied to the one or more hydrogen fuel cells for producing electrical power or is stored in one or more hydrogen storage tanks.

According to a further aspect of the invention, a marine vessel comprises an onboard system for producing syngas. The onboard system comprises one or more heating units, and a gasification unit supplied with waste material and heated by the one or more heating units. The gasification unit produces syngas from the waste material. The onboard system further comprises a scrubber into which the syngas is passed, and one or more hydrogen fuel cells. Hydrogen gas is separated out from the syngas by the scrubber, wherein the hydrogen gas is either supplied to the one or more hydrogen fuel cells for producing electrical power or is stored in one or more hydrogen storage tanks.

BRIEF DESCRIPTION OF THE DRAWINGS

Other aspects and advantages of the present invention will become apparent upon consideration of the following detailed description, wherein similar structures have similar reference numerals.

DETAILED DESCRIPTION

The following detailed embodiments presented herein are for illustrative purposes. That is, these detailed embodiments are intended to be exemplary of the present invention for the purposes of providing and aiding a person skilled in the pertinent art to readily understand how to make and use of the present invention.

Figure 1:
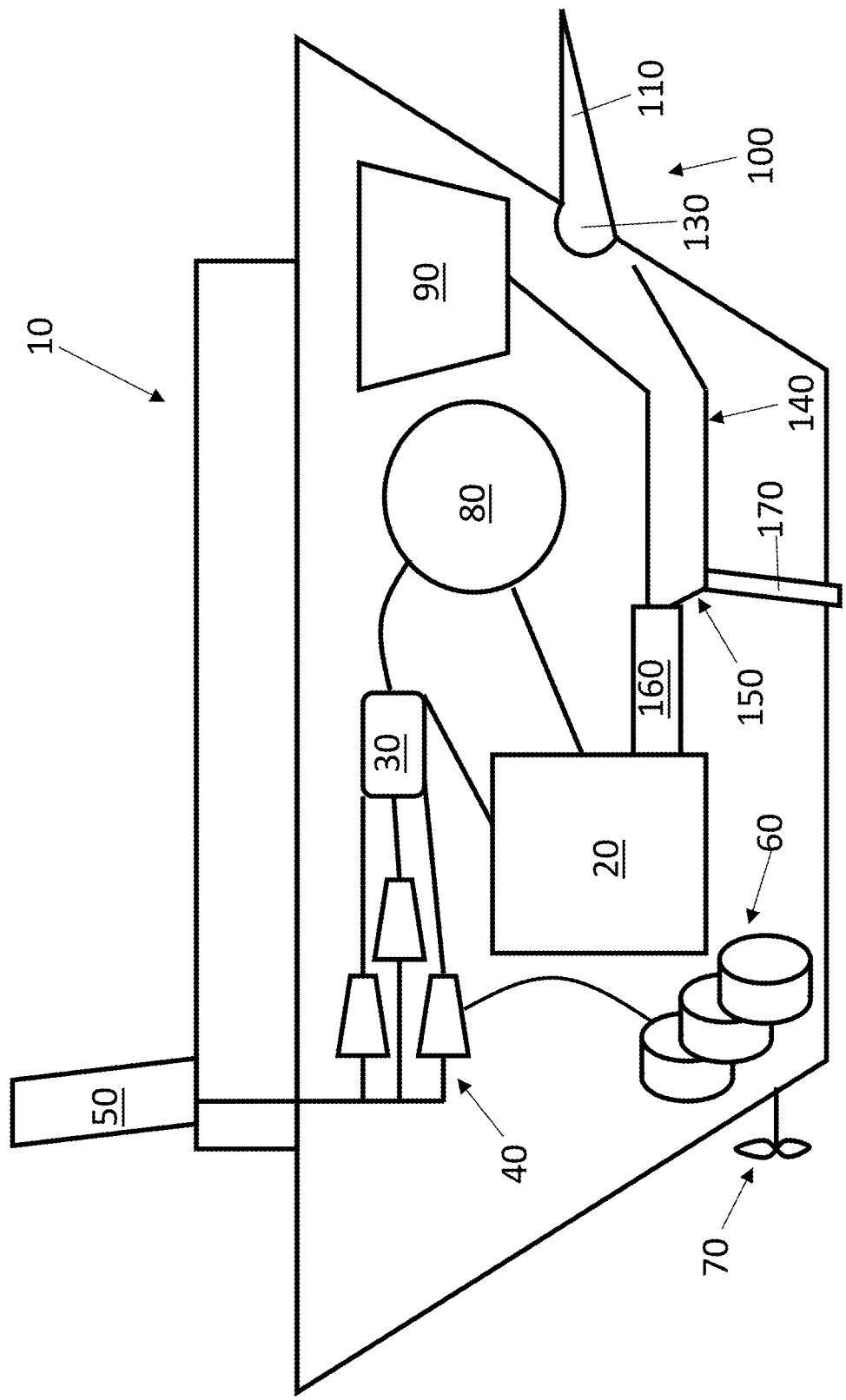
FIG. 1 is a schematic view of a first embodiment of a syngas powered vessel.

Referring to FIG. 1, in one embodiment, a syngas powered vessel 10 shown schematically includes a system 20 for producing syngas from a feedstock as is known in the art. In one embodiment the syngas producing system 20 is modular comprising one or more modular sub-elements that can be swapped in and out as will be further described hereinbelow. In one embodiment, syngas generated by the system 20 is fed to a combustor 30 as is known in the art. The combustor 30 burns the syngas in an appropriate mixture of gases as is known in the art to produce hot exhaust gases. In one embodiment the combustor 30 is a modular combustor 30 that can be swapped in or out for maintenance or repair or to accommodate changes in required capacity.

In one embodiment the hot exhaust gases are directed to expand through one or more turbines. In some embodiments the one or more turbines are mechanically connected with one or more electrical generators as is known in the art, for example, as a turbine/generator assembly, illustrated schematically as element 40 in FIG. 1. In some embodiments the one or more turbines, the one or more electrical generators, and the turbine/generator assembly 40 are all modular allowing for the swapping out of turbines and generators for maintenance or repair or to accommodate changes in required capacity. In other embodiments the one or more turbines are mechanically connected with other rotating machinery on board the marine vessel, for example without limitation, a transmission for controlling the rotational speed of the rotating machinery, or directly or indirectly mechanically connected to the rotating machinery including the marine vessel's propulsion system 70.

In another embodiment the hot exhaust gases are directed to a boiler for the purpose of producing steam that is then directed to expand through the turbine/generator assembly 40. For purposes of illustration, element 30 schematically represents the combustor, or a combined combustor and boiler assembly. In some embodiments the combined combustor and boiler assembly is modular comprising a modular combustor and a modular boiler that can each be swapped in or out for maintenance or repair or to accommodate changes in required capacity. Expanded exhaust gases or steam having passed through the turbine/generator assembly 40 is directed to a smokestack 50 and directed out of the vessel 10.

Power generated by the turbine/generator assembly 40 can be used throughout the vessel 10 or stored in storage batteries on board the vessel 10 for later, backup, and/or emergency use throughout the vessel 10. In one embodiment for example without limitation the power generated or stored in storage batteries from prior generation is used to drive motors 60 that drive the vessel's propulsion system 70 as is known in the art. The power generated or stored in storage batteries from prior generation can also be used for driving the energy requirements of the syngas producing system 20 as well as any other systems aboard the vessel 10 requiring electrical power.

In one embodiment, syngas produced by the system 20 is not directed to the combustor and boiler assembly 30, but rather is directed to a syngas storage tank 80. Syngas stored in the syngas storage tank 80 can later be directed to the combustor and boiler assembly 30, or alternatively could be directed off the vessel 10, for example, to be sold at a port of call for the vessel 10. Syngas thus sold at the port of call can subsequently be stored and/or used at the port of call for the generation of power for the port of call.

In one embodiment, the syngas producing system 20 is built into the vessel 10 during manufacture thereof. In another embodiment, the syngas producing system 20 is added as a retrofit to a vessel 10 already having a system for the generation of electrical and motive power for the vessel 10. In an embodiment where the system 20 is a retrofit, any furnaces and/or pre-existing portions of the system for the generation of electrical and/or motive power of the vessel 10, including without limitation, furnaces, engines, boilers, and the like, would be removed and replaced by the elements described hereinabove for the generation of electrical and motive power using syngas made onboard in a syngas producing system 20 from a feedstock.

In one embodiment the vessel 10 receives carbonaceous feedstock from one or more ports of call. The feedstock may be immediately directed to the syngas producing system 20, or alternatively, the feedstock may be stored in a feedstock storage tank 90 for later direction to the syngas producing system 20.

Figure 3:
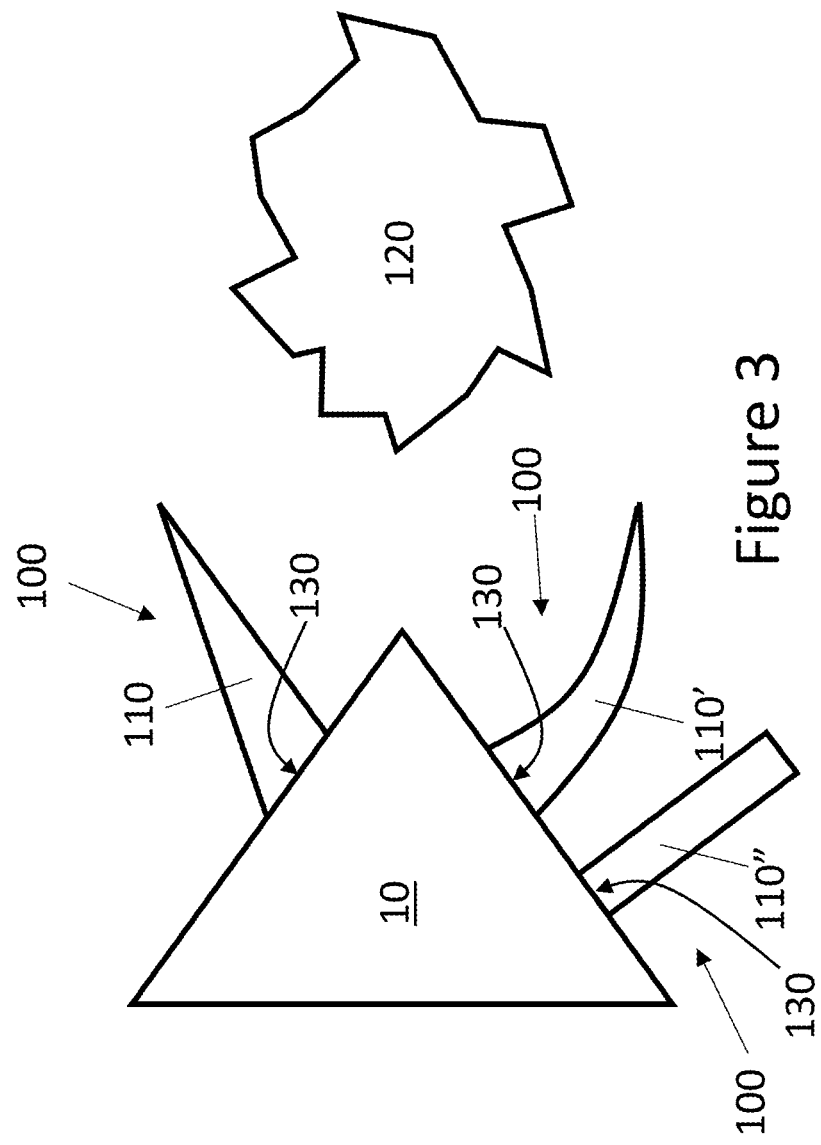
FIG. 3 is a schematic view of non-limiting embodiments of an intake assembly.

In another embodiment, the vessel 10 collects feedstock in the form of debris floating at or near the surface of the water by moving through the water. For example, in this embodiment, the vessel 10 includes an intake assembly 100 disposed at least on a front of the vessel 10. In some embodiments the intake assembly could also be disposed along lateral sides of the vessel 10. The intake assembly 100 comprises one or more intake guides 110 that use the force of the vessel 10 moving through patches 120 of floating debris to guide a portion or all of the patches 120 of floating debris into one or more guide tubes 130 disposed through the front and/or sides of the vessel 10. As illustrated in FIG. 3, the intake guides 110 can be any shape as may be known in the art including, for example, without limitation, a triangular structure 110, or a horn shaped structure 110', or a rectangular structure 110", or any other shape of structure suitable for guiding at least a portion of a patch 120 of floating debris into the one or more guide tubes 130.

Referring again to FIG. 1, feedstock collected via the intake assembly 100 is directed to a settling tank 140 (shown schematically) having holes of various sizes (not shown) as known in the art disposed through a bottom portion thereof. Larger pieces of debris cannot pass through the largest holes while smaller pieces of debris pass through the largest holes but not through smaller holes, and so forth, until debris of at least one or more sizes is collected and transferred either manually or via a conveyor system 150 toward a shredder 160. Sea water collected with the debris passes through the holes of various sizes and is discharged back into the surroundings, for example through a bilge pathway 170. In one embodiment, debris that is non-metallic goes through the shredder 160 and is directed into the syngas system 20. In this embodiment, metallic debris is sorted out using a metallic sorting method as known in the art, for example, using at least system of magnets for the ferrous metals. In other embodiments, all of the debris is directed into the shredder 160.

Figure 2:
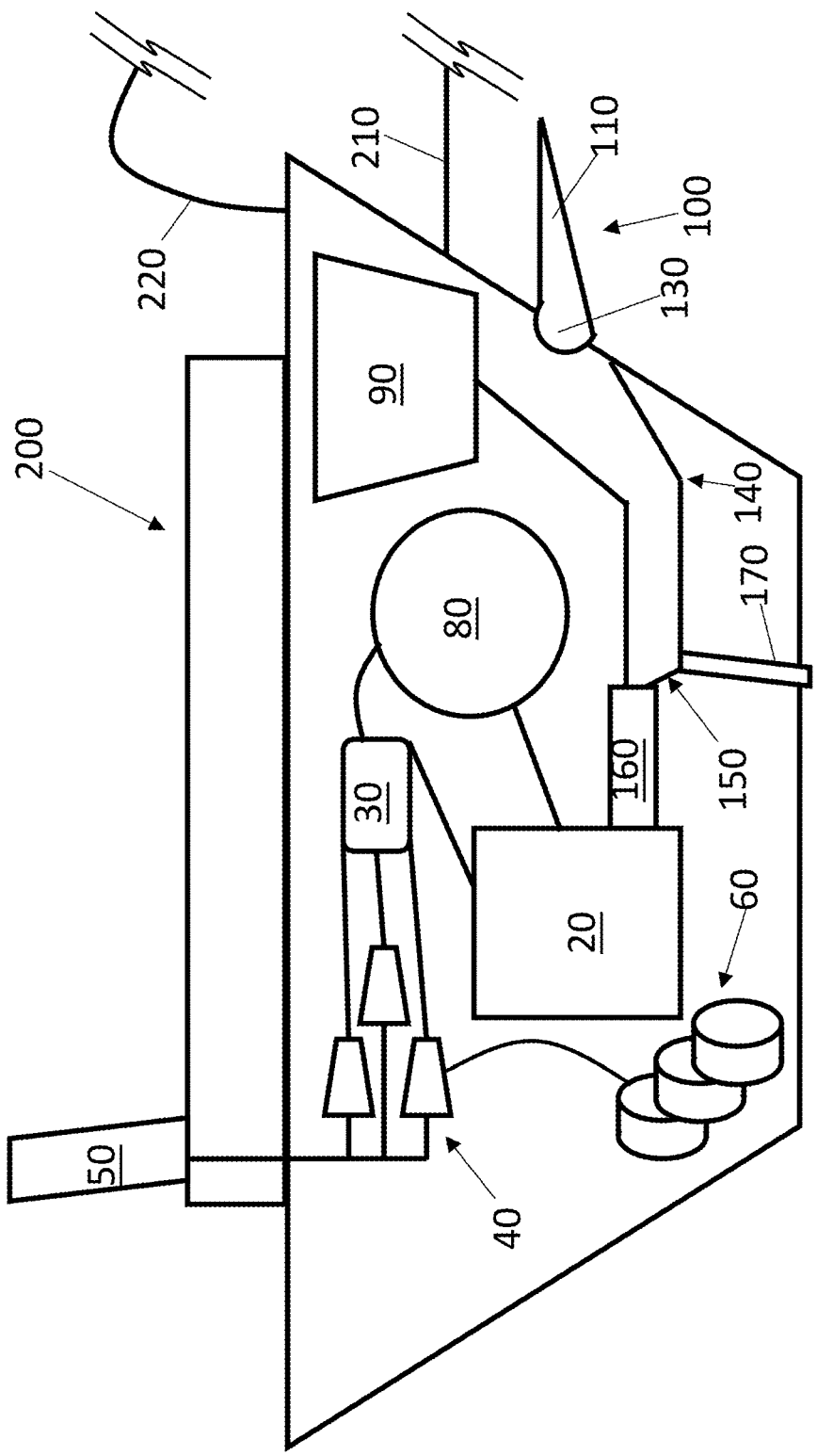
FIG. 2 is a schematic view of a second embodiment of a syngas powered vessel.

Referring to FIG. 2, in another embodiment, a barge or other unpowered or powered vessel 200 as may be known in the art may be towed behind a primary vessel (not shown in FIG. 2). In one embodiment, the barge 200 includes all of the elements already described hereinabove with respect to the vessel 10. All of the elements common to both of the embodiments 10, 200 are shown in FIG. 2 having the same reference numeral as used in FIG. 1.

The barge embodiment 200 may include an independent propulsion system 70 (as shown in FIG. 1) or may not have a propulsion system as shown in FIG. 2. Because the barge 200 is intended to be pulled behind a primary vessel (not shown), a means for attachment 210, for example without limitation, one or more ropes, chains, cables, or other suitable elements for pulling a barge as may be known in the art attaches to a front end of the barge 200. In addition, because the electrical power generated by the barge 210 can be useful aboard the primary vessel (not shown), this embodiment further includes a cabling assembly 220 for electrically connecting the barge 200 to electrical systems aboard the primary vessel (not shown). The cabling assembly 220 may be a separate assembly as shown in FIG. 2 or may be intertwined with the means for attachment 210, or may be routed in any other suitable path between the barge 200 and the primary vessel (not shown) as is known in the art.

Utilizing the hereinabove described syngas powered vessel or barge, a cargo vessel operator can power their vessels using syngas acquired from ports of call. The municipality or other entity associated with the port of call can provide feedstock for the production of the syngas. The feedstock can be in the form of industrial or residential waste and/or other garbage that the port of call pays the cargo vessel operator to take off their hands. As an example, near major ports in the United States the cost of landfill or compost for disposal of organic waste ranges from about 110 to 200 dollars a ton. A cargo operator having the hereinabove syngas powered vessel or barge can successfully acquire all the feedstock it needs from the port of call by simply charging the port of call slightly less than the going rate, for example, by charging 10 dollars less per ton. Such a deal would not only provide feedstock for the cargo vessel operator but would also provide additional savings on fuel cost (or even profit), while having the added benefit of preventing more waste from ending up in a landfill or being incinerated.

Once underway between ports, the cargo vessel operator can further utilize the above-described system to collect feedstock from the seaways, rivers, canals, and any other pathways traversed by the cargo vessel 10 or barge 200. Once again, such collection of feedstock provides a free source of fuel to the cargo vessel operator, while again having the added benefit of cleaning up waste floating in the world's waterways.

Figure 3A:
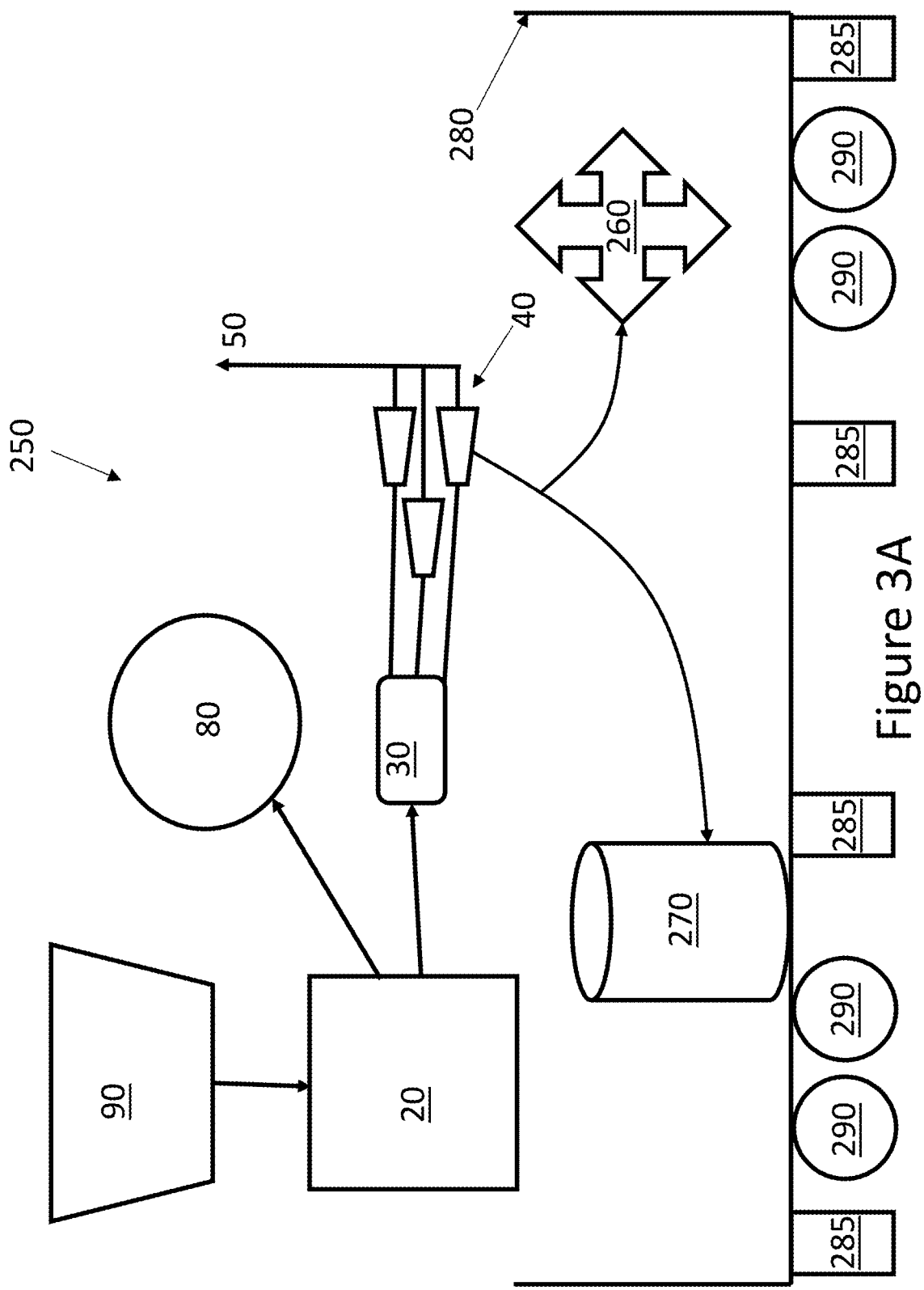
FIG. 3A is a schematic view of a fixed or mobile land based syngas power generation system.

Referring to FIG. 3A, in another embodiment, a fixed or mobile land based syngas power generation system 250 for the generation of syngas and power from waste material is schematically illustrated. The system 250 receives carbonaceous feedstock from one or more ports of call, from a municipal or other dump site or directly from production sources of the waste material as known in the art. The feedstock may be immediately directed to the syngas producing system 20, or alternatively, the feedstock may be stored in a feedstock storage tank 90 for later direction to the syngas producing system 20.

Similar to the prior disclosed embodiments, syngas generated by the system 20 is fed to a combustor 30 as is known in the art. The combustor 30 burns the syngas in an appropriate mixture of gases as is known in the art to produce hot exhaust gases. In one embodiment the hot exhaust gases are directed to expand through one or more turbines. In some embodiments the one or more turbines are mechanically connected with one or more electrical generators as is known in the art, for example, as a turbine/generator assembly, illustrated schematically as element 40 in FIG. 3A.

In another embodiment the hot exhaust gases are directed to a boiler for the purpose of producing steam that is then directed to expand through the turbine/generator assembly

40. For purposes of illustration, element 30 schematically represents the combustor, or a combined combustor and boiler assembly. Expanded exhaust gases or steam having passed through the turbine/generator assembly 40 is directed to a smokestack 50 and directed out of the fixed or mobile land based syngas power generation system 250.

Still referring to FIG. 3A, power generated by the turbine/generator assembly 40 can be supplied for local use within or near to the fixed or mobile land based system 250, or can be supplied to a power grid 260, or can be otherwise stored in storage batteries 270 for later, backup, and/or emergency use locally or via the power grid 260. The system 250 as noted may be fixed or mobile. In one embodiment the system 250 is illustrated within a building, housing, or otherwise surrounding, supporting, or encompassing structure 280, which can be disposed directly within a fixed building or be disposed on a fixed support structure as part of a fixed installation as shown schematically by supports 285 in FIG. 3A. Alternatively, in another embodiment, the system 250 is disposed within a building, housing, or otherwise surrounding, supporting, or encompassing structure 280 that is mobile as shown by schematically by the wheels 290 in FIG. 3A. The system 250 can be fixed with the supports 285, mobile with the wheels 290, or both wherein the supports 285 can be lowered to fix the system 250 to the ground but raised again to place the system 250 on the wheels 290 for transport.

In one embodiment of the fixed or mobile land based syngas power generation system 250, syngas produced by the system 20 is not directed to the combustor and boiler assembly 30, but rather is directed to a syngas storage tank 80. Syngas stored in the syngas storage tank 80 can later be directed to the combustor and boiler assembly 30, or alternatively could be directed out of the fixed or mobile land based syngas power generation system 250, for example, to be sold at a municipality, a power plant, or even at a port of call for a vessel 10 having a similar syngas power system as noted hereinabove. Syngas thus sold to the power plant or municipality or to the port of call can subsequently be stored and/or used for the generation of power locally or for use the grid in general.

All of the embodiments described hereinabove with regard to FIGS. 1-3A comprise modular elements that can be swapped in and out for maintenance, replacement, repair, or change of required capacity as may be needed. For example, the syngas producing system 20, the combustor (or combined combustor and boiler assembly) 30, the turbine/generator assembly 40, the drive motors 60, the syngas storage tank 80, the batteries 270 and any other of the components described hereinabove can be modular and swappable as described.

Figure 4:
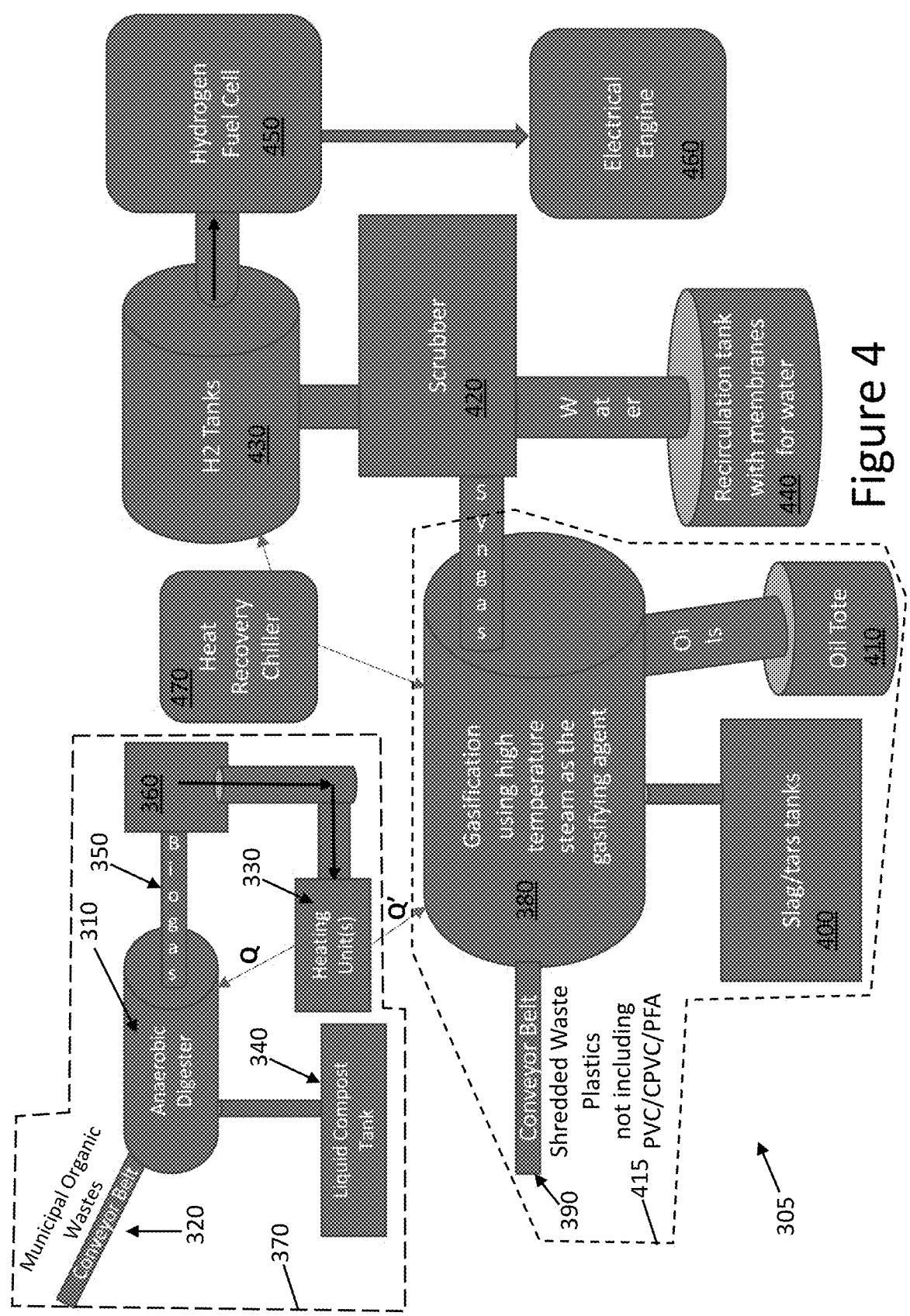
FIG. 4 is a schematic view of an exemplary embodiment of a modular syngas system having an $H_2$ generator.

Referring to FIG. 4, in a first embodiment a schematic of a modular syngas system 305 having an $H_2$ generator is shown. The modular syngas system 305 of FIG. 4 can be manufactured in a modular fashion for use on a marine vessel, on a fixed or mobile land based platform or vehicle, or elsewhere. For example, the modular syngas system 305 can be manufactured for use on a fixed or mobile land based syngas power generation system like the system 250 described and illustrated hereinabove with regard to FIG. 3A, but including some additional elements as described hereinbelow. Starting at the top left in FIG. 4, in one embodiment municipal organic wastes are supplied to an anaerobic digester 310, which for example without limitation can be an enclosed and heated tank having a mechanical mixing system for mixing the contents or as otherwise is known in the art. The municipal organic wastes may be sourced from a port of call or directly from a waste dump or from any available source of municipal waste. The municipal organic wastes could be supplied to the anaerobic digester for example without limitation by being carried on a conveyor belt 320.

Heat, Q, from one or more heating units 330 is applied to the anaerobic digester 310 and the contents are mixed. Upon such treatment the contents break down into a liquid waste compost and a gas also known as biogas. The liquid waste compost is diverted out of a bottom of the anaerobic digester 310 into a liquid compost tank 340. The biogas is diverted to a pipe 350 from where it can be collected in a tank 360 or further diverted to flow to the one or more heating units 330, wherein it is burned to provide at least a portion of the heat, Q, that is applied to the anaerobic digester 310.

In one embodiment one or all of the anaerobic digester 310, the conveyor belt 320, the one or more heating units 330, the liquid compost tank 340, the pipe 350, and the tank 360 comprise an anaerobic digestion module 370 as indicated by the dashed lines labeled 370. In another embodiment the anaerobic digestion module 370 includes one or more of the other components illustrated in FIG. 4 outside of the dashed lines 370. In some embodiments, portions of the anaerobic digestion module 370 are further modular, for example by being removable. For example, the conveyor belt 320 in one embodiment detaches from the anaerobic digester 310. Likewise, in another embodiment the liquid compost tank 340 can be detached from the anaerobic digester 310, for example without limitation, for emptying or replacement. Similarly, the pipe 350 and the tank 360 may also be removable, for example without limitation, for cleaning and/or replacement. The one or more heating units 330 are also modular in that in one embodiment each of the one or more heating units 330 can be separately activated or deactivated or detached from the anaerobic digestion module 370. Biogas that is diverted to flow to the one or more heating units 330 is burned therein to provide heat, Q', for application to a gasification unit 380.

Still referring to FIG. 4, in one embodiment additional waste materials are supplied to the gasification unit 380. In the exemplary embodiments illustrated in FIGS. 4-7, shredded waste plastics not including polyvinyl chloride (PVC), chlorinated polyvinyl chloride (CPVC), or perfluoroalkoxy alkane (PFA) are supplied to the gasification unit 380. In fact, the gasification unit 380 shown as part of the embodiments 305, 505, 605, and 705 as illustrated in FIGS. 4-7, respectively is not limited to being supplied with only waste plastics, but rather can be supplied with any of the waste materials disclosed hereinabove in the background section, including for example without limitation, naturally occurring materials such as coal, natural gas, and wood, as well as waste such as household or industrial waste, sludge, electronics, organic waste, agricultural waste, chemical waste, plastics, and even old vehicle tires, among other known types of garbage. It further follows that the municipal organic wastes disclosed hereinabove as being supplied to the anaerobic digester 310 can also be supplied to the gasification unit 380 that is illustrated as part of the embodiments 305, 505, 605, and 705 as illustrated in FIGS. 4-7, respectively.

The gasification unit 380 for example without limitation comprises a system that uses heated air and/or steam as is known in the art to produce syngas and other by products from the waste materials, for example, from the waste plastics. The waste materials fed to the gasification unit 380 may be sourced from a port of call or directly from a waste dump or from any available source of municipal waste, including being collected from the oceans and waterways as described hereinabove and/or disclosed in the '071 Provisional Patent Application. In one embodiment, the waste materials could be supplied to the gasification unit 380 for example without limitation by being carried on a conveyor belt 390.

In addition to producing syngas, the gasification unit 380 produces other by products of various molecular weights. Tars and slag are collected into one or more slag tanks 400. Hydrocarbon oils are separated from the tars and slag and collected into one or more oil totes/tanks 110 for resale as fuels.

In one embodiment one or all of the gasification unit 380, the conveyor belt 390, the one or more slag tanks 400, and the one or more oil totes/tanks 410 comprise a gasification module 415 as indicated by the dashed lines labeled 415. In another embodiment the gasification module 415 includes one or more of the other components illustrated in FIG. 4 outside of the dashed lines 415. In some embodiments, portions of the gasification module 415 are further modular, for example by being removable. For example, the conveyor belt 390 in one embodiment detaches from the gasification unit 380. Likewise, in another embodiment one or more of the one or more slag tanks 400 or one or more of the one or more oil totes/tanks 410 can be detached from the gasification unit 380, for example without limitation, for emptying or replacement. Similarly, any one or more of the pipes interconnecting any of the components of the gasification module 415 may also be removable, for example without limitation, for cleaning and/or replacement.

The produced syngas, which is a mixture of gases comprising hydrogen ($H_2$) is passed from the gasification unit 380 to a scrubber 420 as is known in the art, which cools the syngas and removes any unwanted impurities. In one embodiment without limitation the scrubber 420 is a wet scrubber as is known in the art, wherein the syngas is brought into contact with a cleansing liquid, typically water. Cooling the syngas allows the hydrogen to be easily separated out from the other constituents.

In some embodiments, the hydrogen is stored in one or more hydrogen tanks 430. In other embodiments the hydrogen could be passed directly to one or more hydrogen fuel cells 450, thereby bypassing the hydrogen storage tanks 430, or, alternatively could be passed directly to the one or more hydrogen fuel cells 450 up to the capacity of the one or more fuel cells to accept the hydrogen with any additional or over supply then being diverted into the one or more hydrogen fuel tanks 430.

In embodiments having a wet scrubber 420, water used in scrubbing the syngas is passed to a recirculation tank 440 and therein passed through one or more filtering membranes that capture contaminants in the water. After passing through the one or more membranes in the recirculation tank 440 the water is returned to the scrubber 420. The water may be moved between the scrubber 420 and the recirculation tank 440 and passed through the one or more membranes by any one or more of a gravity feed, one or more pumps, or other mechanisms for moving water as is known in the art.

Still referring to FIG. 4, in some embodiments the hydrogen stored in the one or more hydrogen tanks 430 is passed to one or more hydrogen fuel cells 450. The one or more hydrogen fuel cells 450 utilize the hydrogen to produce electrical power as is known in the art. In one embodiment, the electrical power produced by the one or more hydrogen fuel cells 450 is used to power one or more electrical engines 460 (or motors 60 as described hereinabove). In other embodiments the electrical power is used to power other aspects of a vessel or a land-based fixed or mobile installation, or transmitted away from the vessel or land-based fixed or mobile installation to feed a power grid as a source of power for cities and in general.

In one embodiment the modular syngas system 305 further includes a heat recovery chiller 470, for example, a heat exchanger or other device as is known in the art. The heat recovery chiller 470 is disposed between the one or more hydrogen tanks 430 and the gasification unit 380. In one embodiment the heat recovery chiller 470 helps to cool the one or more hydrogen tanks 430 and can further be used for other purposes as are known in the art. For example, heat recovered by the heat recovery chiller 470 could be used to heat the gasification unit 380.

Similar to the anaerobic digestion module 370 and the gasification module 415, any one or more of the above described components consisting of the scrubber 420, the one or more hydrogen tanks 430, the recirculation tank 440, the one or more hydrogen fuel cells 450, the electrical engine 460, the heat recovery chiller 470, and any one or more of the other components illustrated in FIG. 4 may be individually removable modules or may be combined into one or more removable modules.

Figure 5:
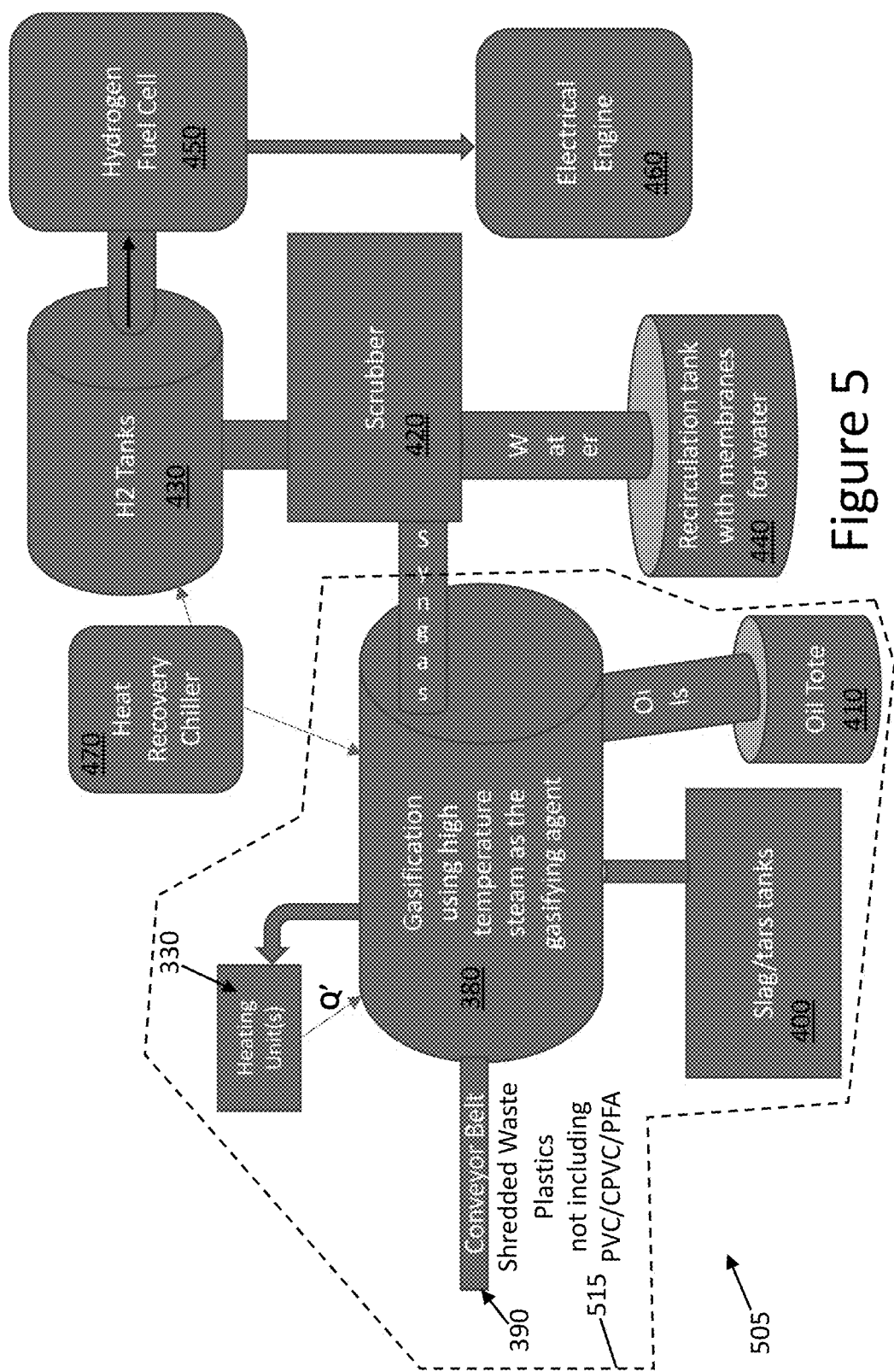
FIG. 5 is a schematic view of another exemplary embodiment of a modular syngas system having an $H_2$ generator.

Referring now to FIG. 5, in another embodiment a schematic of a modular syngas system 505 having an $H_2$ generator is shown. The modular syngas system 505 of FIG. 5 can be manufactured in a modular fashion for use on a marine vessel, on a fixed or mobile land based platform or vehicle, or elsewhere. For example, the modular syngas system 505 can be manufactured for use on a fixed or mobile land based syngas power generation system like the system 250 described and illustrated hereinabove with regard to FIG. 3A, but including some additional elements as described hereinbelow. The modular syngas system 505 is largely similar to the modular syngas system 305 described hereinabove with respect to FIG. 4; however, there are some differences. The modular syngas system 505 lacks the anaerobic digester 310 (and associated conveyor belt 320) for digestion of municipal organic wastes. The modular syngas system 505 also lacks the liquid compost tank 340, the pipe 350, and the tank 360 for collection of biogas. However, the modular syngas system 505 does include the one or more heating units 330. In this embodiment, a portion of the syngas produced by the gasification unit 380 is directed to fuel the one or more heating units 330, which then produce the heat Q' used to produce high temperature steam for the gasification unit 380. The other components of the modular syngas system 505 are the same as the components of the modular syngas system 305 having the same reference numerals.

Still referring to FIG. 5, in one embodiment one or all of the one or more heating units 330, the gasification unit 380, the conveyor belt 390, the one or more slag tanks 400, and the one or more oil totes/tanks 410 comprise a gasification module 515 as indicated by the dashed lines labeled 515. In another embodiment the gasification module 515 includes one or more of the other components illustrated in FIG. 5 outside of the dashed lines 515. In some embodiments, portions of the gasification module 515 are further modular, for example by being removable. For example, the conveyor belt 390 in one embodiment detaches from the gasification unit 380. Likewise, in another embodiment one or more of the one or more slag tanks 400 or one or more of the one or more oil totes/tanks 410 can be detached from the gasification unit 380, for example without limitation, for emptying or replacement. Similarly, any one or more of the pipes interconnecting any of the components of the gasification module 515 may also be removable, for example without limitation, for cleaning and/or replacement.

Further, any one or more of the components of the modular syngas system 505 described hereinabove consisting of the scrubber 420, the one or more hydrogen tanks 430, the recirculation tank 440, the one or more hydrogen fuel cells 450, the electrical engine 460, the heat recovery chiller 470, and any one or more of the other components illustrated in FIG. 5 may be individually removable modules or may be combined into one or more removable modules.

Figure 6:
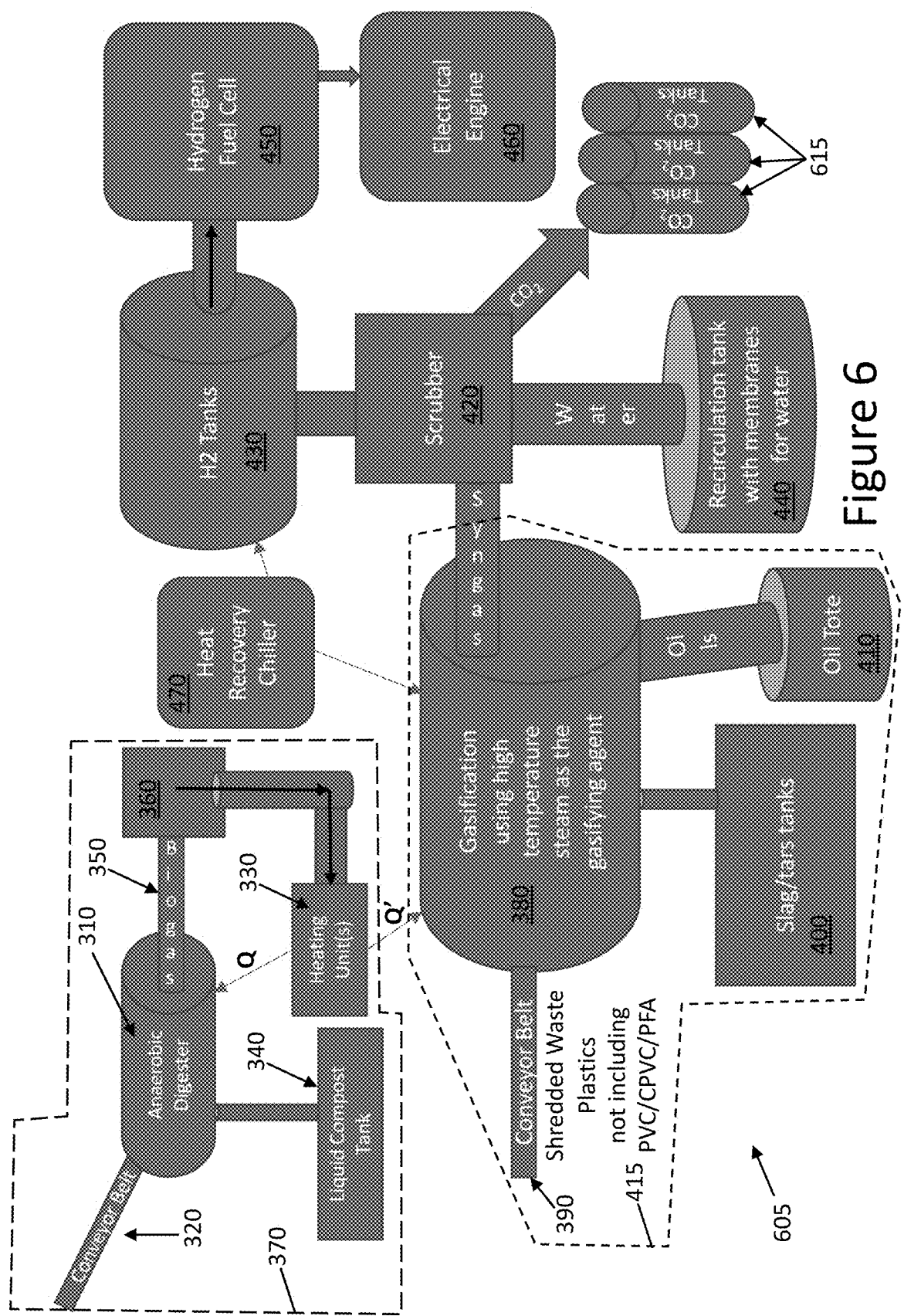
FIG. 6 is a schematic view of a further embodiment of a modular syngas system having an $H_2$ generator.

Referring now to FIG. 6, in another embodiment a schematic of a modular syngas system 605 having an $H_2$ generator is shown. The modular syngas system 605 of FIG. 6 can be manufactured in a modular fashion for use on a marine vessel, on a fixed or mobile land based platform or vehicle, or elsewhere. For example, the modular syngas system 605 can be manufactured for use on a fixed or mobile land based syngas power generation system like the system 250 described and illustrated hereinabove with regard to FIG. 3A, but including some additional elements as described hereinbelow. The modular syngas system 605 is largely similar to the modular syngas system 305 described hereinabove with respect to FIG. 4; however, the modular syngas system 605 further includes some additional components. For example, syngas produced in the gasification unit 380 is passed to the scrubber 420 like in the embodiment illustrated in FIG. 4. However, in this embodiment in addition to hydrogen being collected by the scrubber 420 and stored in the one or more hydrogen tanks 430, carbon dioxide ($CO_2$) is also collected by the scrubber 420 and captured in one or more tanks/cylinders 615 for re-use and/or sale. The other components of the modular syngas system 605 are the same as the components of the modular syngas system 305 having the same reference numerals.

Still referring to FIG. 6, in one embodiment one or all of the anaerobic digester 310, the conveyor belt 320, the one or more heating units 330, the liquid compost tank 340, the pipe 350, and the tank 360 comprise an anaerobic digestion module 370 as indicated by the dashed lines labeled 370. In another embodiment the anaerobic digestion module 370 includes one or more of the other components illustrated in FIG. 6 outside of the dashed lines 370. In some embodiments, portions of the anaerobic digestion module 370 are further modular, for example by being removable. For example, the conveyor belt 320 in one embodiment detaches from the anaerobic digester 310. Likewise, in another embodiment the liquid compost tank 340 can be detached from the anaerobic digester 310, for example without limitation, for emptying or replacement. Similarly, the pipe 350 and the tank 360 may also be removable, for example without limitation, for cleaning and/or replacement. The one or more heating units 330 are also modular in that in one embodiment each of the one or more heating units 330 can be separately activated or deactivated or detached from the anaerobic digestion module 370.

Still referring to FIG. 6, in one embodiment one or all of the gasification unit 380, the conveyor belt 390, the one or more slag tanks 400, and the one or more oil totes/tanks 410 comprise a gasification module 415 as indicated by the dashed lines labeled 415. In another embodiment the gasification module 415 includes one or more of the other components illustrated in FIG. 6 outside of the dashed lines 415. In some embodiments, portions of the gasification module 415 are further modular, for example by being removable. For example, the conveyor belt 390 in one embodiment detaches from the gasification unit 380. Likewise, in another embodiment one or more of the one or more slag tanks 400 or one or more of the one or more oil totes/tanks 410 can be detached from the gasification unit 380, for example without limitation, for emptying or replacement. Similarly, any one or more of the pipes interconnecting any of the components of the gasification module 415 may also be removable, for example without limitation, for cleaning and/or replacement.

Further, any one or more of the components of the modular syngas system 605 described hereinabove consisting of the scrubber 420, the one or more hydrogen tanks 430, the recirculation tank 440, the one or more hydrogen fuel cells 450, the electrical engine 460, the heat recovery chiller 470, the one or more tanks/cylinders 615, and any one or more of the other components illustrated in FIG. 6 may be individually removable modules or may be combined into one or more removable modules.

Figure 7:
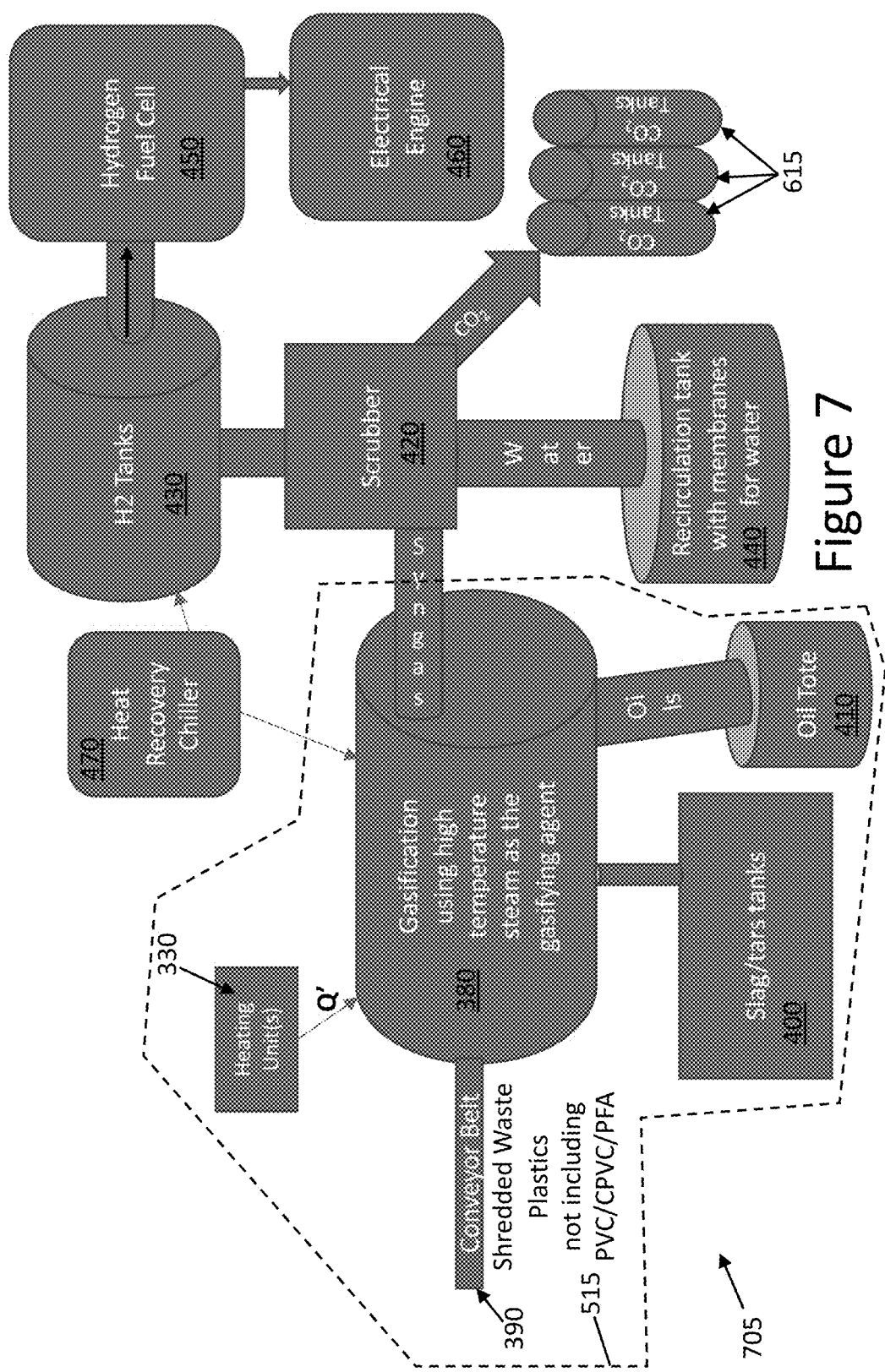
FIG. 7 is a schematic view of yet another exemplary embodiment of a modular syngas system having an $H_2$ generator.

Referring now to FIG. 7, in another embodiment a schematic of a modular syngas system 705 having an $H_2$ generator is shown. The modular syngas system 705 of FIG. 7 can be manufactured in a modular fashion for use on a marine vessel, on a fixed or mobile land based platform or vehicle, or elsewhere. For example, the modular syngas system 305 can be manufactured for use on a fixed or mobile land based syngas power generation system like the system 250 described and illustrated hereinabove with regard to FIG. 3A, but including some additional elements as described hereinbelow. The modular syngas system 705 is largely similar to the modular syngas system 605 described hereinabove with respect to FIG. 6; however, there are some differences. The modular syngas system 705 lacks the anaerobic digester 310 (and associated conveyor belt 320) for digestion of municipal organic wastes. The modular syngas system 705 also lacks the liquid compost tank 340, the pipe 350, and the tank 360 for collection of biogas. However, the modular syngas system 705 does include the one or more heating units 330. In this embodiment, a portion of the syngas produced by the gasification unit 380 is directed to fuel the one or more heating units 330, which then produce the heat Q' used to produce high temperature steam for the gasification unit 380. The other components of the modular syngas system 705 are the same as the components of the modular syngas system 605 having the same reference numerals.

Still referring to FIG. 7, in one embodiment one or all of the one or more heating units 330, the gasification unit 380, the conveyor belt 390, the one or more slag tanks 400, and the one or more oil totes/tanks 410 comprise the gasification module 515 as indicated by the dashed lines labeled 515. In another embodiment the gasification module 515 includes one or more of the other components illustrated in FIG. 7 outside of the dashed lines 515. In some embodiments, portions of the gasification module 515 are further modular, for example by being removable. For example, the conveyor belt 390 in one embodiment detaches from the gasification unit 380. Likewise, in another embodiment one or more of the one or more slag tanks 400 or one or more of the one or more oil totes/tanks 410 can be detached from the gasification unit 380, for example without limitation, for emptying or replacement. Similarly, any one or more of the pipes interconnecting any of the components of the gasification module 515 may also be removable, for example without limitation, for cleaning and/or replacement.

Further, any one or more of the components of the modular syngas system 705 described hereinabove consisting of the scrubber 420, the one or more hydrogen tanks 430, the recirculation tank 440, the one or more hydrogen fuel cells 450, the electrical engine 460, the heat recovery chiller 470, the one or more tanks/cylinders 615, and any one or more of the other components illustrated in FIG. 7 may be individually removable modules or may be combined into one or more removable modules.

Figure 8:
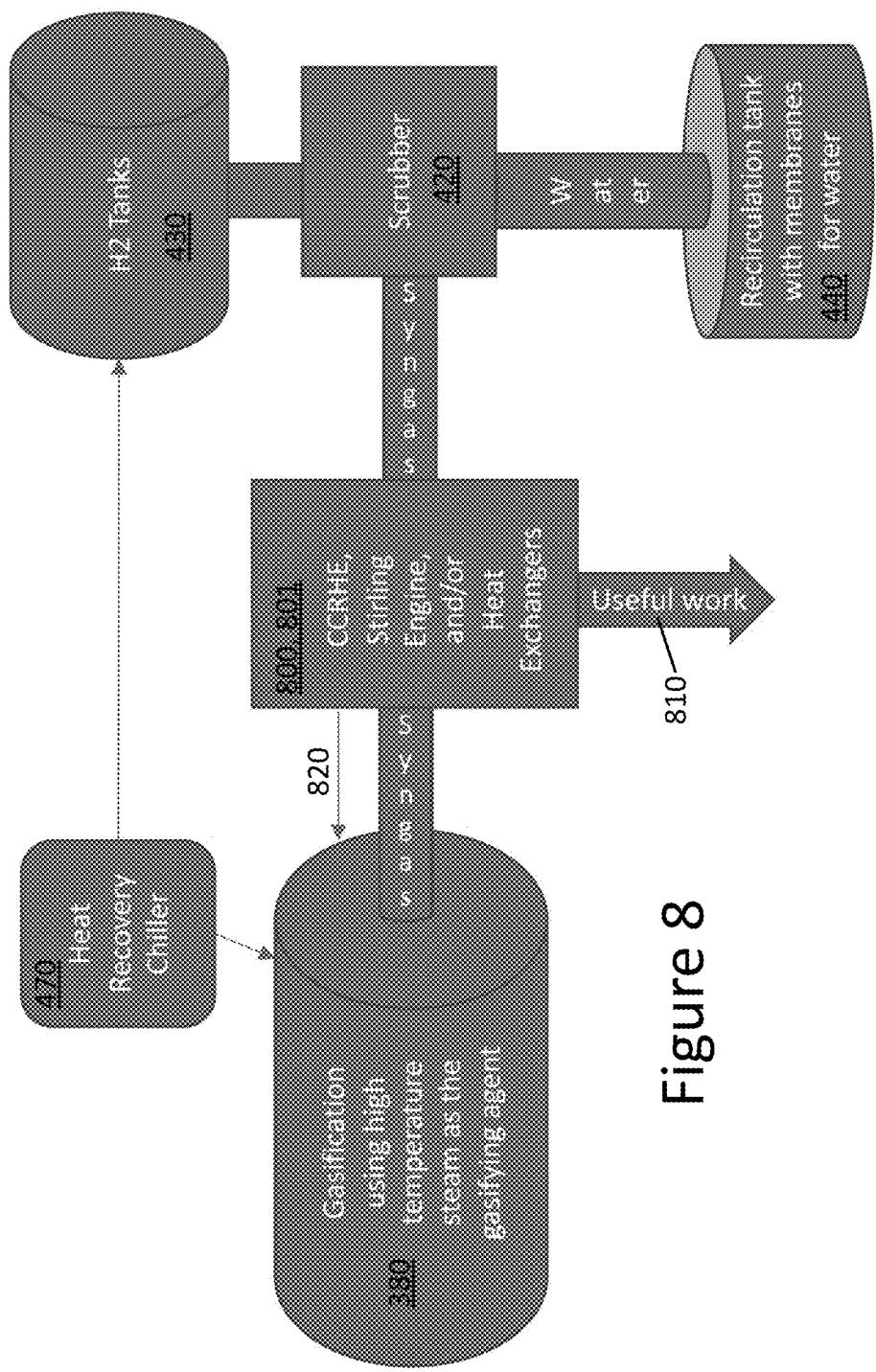
FIG. 8 is a schematic view of any of the embodiments of the modular syngas system described herein further including a closed-cycle regenerative heat engine (CCRHE) added to the system to further improve the overall system efficiency.

Referring to FIG. 8, applicable to any of the embodiments of the modular syngas system 305, 505, 605, 705 described hereinabove, a closed-cycle regenerative heat engine (labeled as CCRHE in FIG. 8) 800 as is known in the art, for example without limitation, a Stirling engine 800, and/or one or more heat exchangers 801 can be added to the system to further improve the overall system efficiency. For example, the portion of the modular syngas system 305, 505, 605, 705 including the gasification unit 380 and the scrubber 420 is shown further including such a closed-cycle regenerative heat engine 800 and/or one or more heat exchangers 801 disposed between the gasification unit 380 and the scrubber 420.

By such placement of the closed-cycle regenerative heat engine 800 and/or one or more heat exchangers 801, at least a portion of the heat lost by passing the syngas from the gasifier unit 380 directly into the scrubber 420 and cooling it therein can be recovered by passing the syngas first through the one or more heat exchangers 801 and/or the one or more heat exchangers 801 connected with the closed-cycle regenerative heat engine 800. Such an arrangement allows for not only an enhanced capture of energy from the syngas, but also powers the closed-cycle regenerative heat engine 800 thereby providing increased useful work (or energy output as shown as numeral 810 in FIG. 8) with less fuel input. The useful work 810 can be used to power devices or systems on board the vessel or drive a generator to generate electricity for use on the vessel or elsewhere. Furthermore, waste heat 820 produced by the closed-cycle regenerative heat engine 800, for example without limitation a Stirling engine 800, can be used as a supplemental heat input 820 for the gasifier unit 380.

A marine vessel equipped with an embodiment of the modular syngas system 305, 505, 605, 705 can collect waste from ports, its own waste streams, and from the oceans and waterways to use as a fuel source, which could result in a non-polluting cargo ship that is self-sustaining with respect to fuel and more profitable to operate. In addition, a marine vessel or a fixed or mobile land based syngas power generation system equipped with an embodiment of the modular syngas system 305, 505, 605, 705 can also be used to provide power to other aspects of the marine vessel or to the fixed or mobile land based installation, or transmitted away from the marine vessel or fixed or mobile land based installation to feed a power grid as a source of power for cities, portions of cities, and in general.

INDUSTRIAL APPLICABILITY

The modular syngas producing system, a vessel powered thereby, and the other elements and methods described herein would be highly beneficial to a vessel operator in providing cost savings and an alternative source of fuel, as well as also providing benefits to the environment. The modular syngas producing system can further generate $H_2$ from the syngas. The $H_2$ generated thereby is used to fuel an $H_2$ fuel cell for the generation of electrical power. The modular syngas producing system, the combustor/combustor and boiler assembly, the turbine/generator assembly, and all the other components described hereinabove can be made in industry for the benefit of industry and for the environment.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

I claim:

1. A marine vessel, comprising:
an onboard system for producing syngas, wherein the onboard system comprises:
one or more heating units;
a gasification unit supplied with waste material and heated by the one or more heating units, wherein the gasification unit produces syngas from the waste material; and
a scrubber having an inlet and an outlet, wherein the inlet of the scrubber is in fluid communication with the gasification unit and the syngas is passed through the scrubber;
one or more hydrogen storage tanks; and
one or more hydrogen fuel cells; wherein
the one or more hydrogen storage tanks is connected via conduits to the outlet of the scrubber and to the one or more hydrogen fuel cells; and
the one or more hydrogen fuel cells is connected via conduits to the outlet of the scrubber and to the one or more hydrogen storage tanks; and
an intake assembly disposed at least on a front of the marine vessel, wherein the intake assembly is configured to collect at least a first portion of the waste material supplied to the gasification unit in the form of debris floating at or near the surface of the water through which the marine vessel passes.

2. The marine vessel of claim 1, wherein:
a second portion of the waste material is supplied from a port of call of the marine vessel; and wherein
the second portion of the waste material is selected from a group consisting of household waste, industrial waste, organic waste, electronics, plastic waste exclusive of polyvinyl chloride, chlorinated polyvinyl chloride, or perfluoroalkoxy alkane, agricultural waste, chemical waste, sludge, old vehicle tires, and combinations thereof.

3. A method of operation of the marine vessel of claim 2, comprising the steps of:
being paid to accept the second portion of the waste material from the port of call;
loading the second portion of the waste material from the port of call onto the marine vessel;
utilizing the first and second portions of the waste material as a feedstock for the onboard system for producing syngas; and
generating electrical power using the one or more hydrogen fuel cells.

4. The marine vessel of claim 2, further comprising:
an anaerobic digester supplied with organic waste and heated by the one or more heating units, wherein the anaerobic digester produces biogas from the organic waste; wherein
at least a portion of the biogas is supplied to the one or more heating units.

5. The marine vessel of claim 2, further comprising:
a heat recovery chiller disposed in thermal contact between the one or more hydrogen storage tanks and the gasification unit; wherein
the heat recovery chiller cools the one or more hydrogen storage tanks.

6. The marine vessel of claim 2, further comprising:
one or more carbon dioxide storage tanks; wherein
carbon dioxide gas is separated out from the syngas by the scrubber, and wherein the carbon dioxide gas is stored in the one or more carbon dioxide storage tanks.

7. The marine vessel of claim 2, further comprising:
a closed-cycle regenerative heat engine disposed between the gasification unit and the scrubber; wherein
the closed-cycle regenerative heat engine recovers heat from the syngas thereby producing useful work therefrom and providing excess waste heat back to the gasification unit.

* * * * *